Aug. 21, 1951     L. J. PULS     2,565,044
LAWN MOWER

Filed Oct. 15, 1947     2 Sheets-Sheet 1

Lawrence J. Puls
Inventor

By   *[signature]*

Atty.

Aug. 21, 1951 — L. J. PULS — 2,565,044

LAWN MOWER

Filed Oct. 15, 1947 — 2 Sheets-Sheet 2

Lawrence J. Puls
Inventor

By Geo E Kirk
Atty.

Patented Aug. 21, 1951

2,565,044

UNITED STATES PATENT OFFICE 2,565,044

LAWN MOWER

Lawrence J. Puls, Portage, Ohio; Clarence J. Durliat, administrator of said Lawrence J. Puls, deceased, assignor to Puls Machine Company, Milton Center, Ohio, a corporation of Ohio Application October 15, 1947, Serial No. 779,962

2 Claims. (Cl. 56—25.4)

This invention relates to trimming or cutting growths of vegetation, and is adapted for effective service beyond that normally required for a lawn mower of a power type.

This invention has utility when incorporated in a light weight, rigid carrier deck for a prime mover, with transmission therefrom to a high-speed cutting disk of hot rolled steel provided with sharpened self-hardening weld blade portions.

Referring to the drawings.

The weld-assembled deck truck

Figure 1:
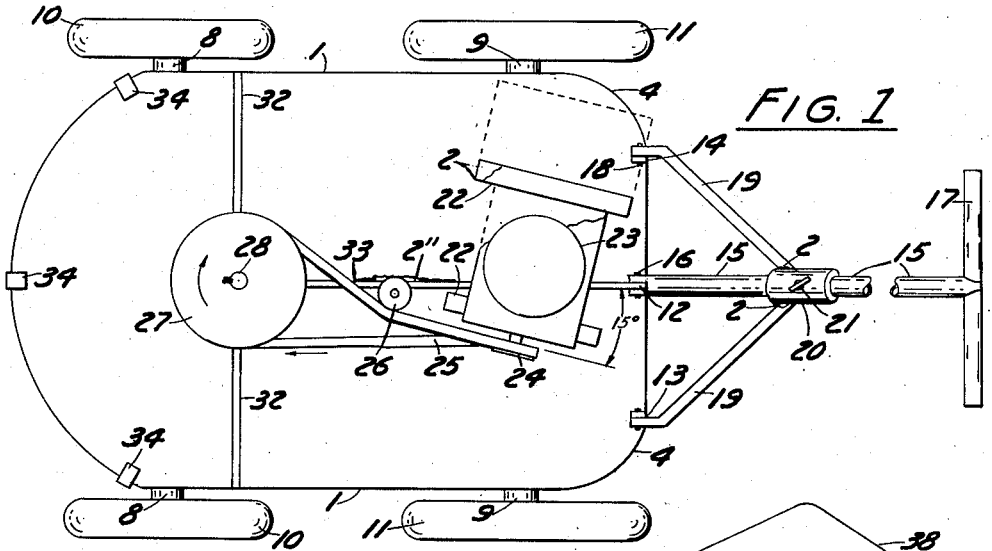
Fig. 1 is a plan view of the invention embodied in a pusher type of lawn mower of sheet metal body, parts being broken away.
Figures 2, 4:
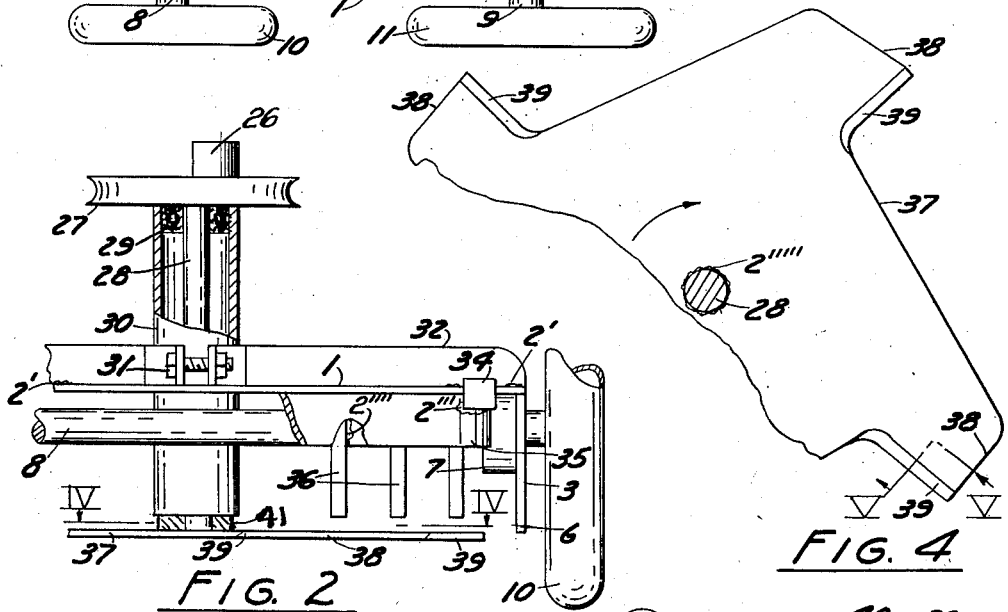
Fig. 2 is a fragmentary enlarged scale view from the front or left of Fig. 1, showing a portion of the guard and the adjustable height mounting for the knife disk or blade.
Fig. 4 is a view on the line IV—IV, Fig. 2, showing the shaft only in section, looking down on a portion of the cutting disk for the mower.

A plate 1, say of #10 gage sheet steel, provides a horizontal deck. Along the sides of the plate 1, from front to back, welds 2 rigidly anchor reinforcement along each side a depending skirt 3, rearwardly terminating in slightly inturned portions 4. These skirts 3 leave a rearward clearance 5 and a front clearance 6 as downward from the deck 1.

Skirt stiffening mountings 7 at the inner side of the skirts 3 and downward from the deck 1, have anchored therein a front axle or shaft 8 and rearwardly from and parallel to the shaft 8 is a second shaft 9 in the skirt 3. Roller bearing equipped rubber tired ground wheels 10 on the shafts 8, say for a 24" width deck 1, may be 10" in diameter, and similar wheels 11 on the shaft 9, say of 12" in diameter.

At the top of the deck 1 and rearwardly, centrally above the clearance 5 is an eye 12. Equally spaced therefrom are additional eyes 13, 14. Light gage tubing 15, say of airplane type, has pivotal connection 16 with the eye 12. The upwardly directed bar or staff 15 terminates in a cross handle 17.

Pivot pins 18 in the eyes 13, 14, coaxial with the pivot pin 16, connect struts 19, upwardly and rearwardly converging to welds providing anchoring means with a sleeve 20 embracing the directing handle tubing 15. The operator locates the cross bar 17 of the handle at the desired height, and then tightens a wing bolt 21 to lock the sleeve 20 with the tubing 15, thereby to hold the handle at such adjusted position rigidly relatively to the deck 1.

The drive and the mounting therefor

In order to provide reinforcement for the deck top 1, as well as mounting means, welds fix angle pieces 22, herein shown as extending about 15° away from parallel to the sides of the deck 1. A prime mover or power drive, herein shown as a four cycle gas engine 23, is anchored with the base pieces 22, and thereby held in position on the deck 1.

A grooved pulley 24 is driven by the motor 23 and has therefrom a cross V-belt 25 extending past a vertical axis guide roller 26, rising from the deck 1. The belt 25 drives a grooved pulley 27 keyed on a vertical shaft 28. Coacting with the shaft 28 are anti-friction bearings 29 in a sleeve 30. The sleeve 30 is adjustable up and down in its extent thru the deck 1, by a clamp mounting 31. In the practice hereunder, the shaft 28 may have a speed of from 500 to 1000 R. P. M. Some speed changes may be from control of the motor 23. Additionally, the pulleys 24, 27, may be substitutive to provide different driving speeds for the shaft 28, even tho the motor 23 may be operated at a constant speed.

In addition to the reinforcement of the deck top 1 by the angle base pieces 22 for the motor 23, welds 2' anchor a rib 32 crosswise of the deck 1 to the clamp 31. Also rearwardly from the clamp 31 there is a rib 33 to the eye 12. The rib 33, thruout its length, has weld 2" bonding with the deck 1. The ribs above deck and the skirting provide strength and rigidity in a light weight structure.

The guard

At the opening 6 are ears 34 assembled by welds 2''' with an arc strip 35. The strip 35 has a depending rim from which extend parallel pins 36. Welds 2'''' anchor the pins 36 in the strip 35.

The cutting disk

Figures 3, 5:
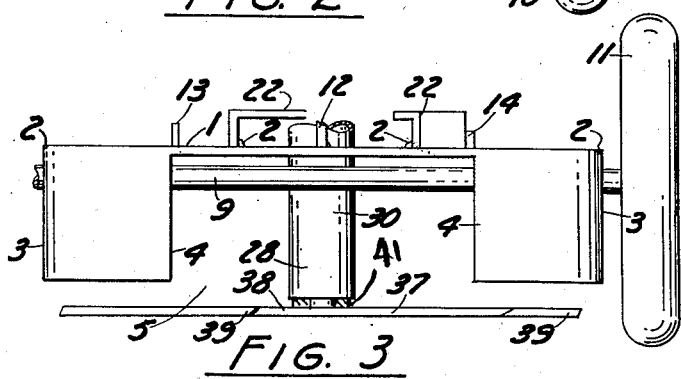
Fig. 3 is a partial view from the rear or right of Fig. 1, somewhat enlarged, with the directing or propulsion handle removed.
Fig. 5 is an enlarged section on the line V—V, Fig. 4, showing the weld-mounted knife edge for the cutting disk.
Figure 9:
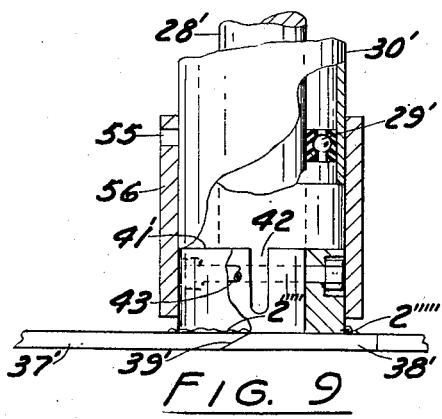
Fig. 9 is an enlarged detail, with parts broken away, of the cutting disk assembly with the drive shaft therefor.

A weld 2''''' fixedly anchors a hot rolled sheet steel disk 37' (Fig. 9) with a collar 41' having from its free end a pair of diametrical notches 42'. Crosswise as to these notches is a bolt 43 thru the lower end of the shaft 28'. The ends of the bolt 43 are countersunk in the collar 41'. The bolt 43 clamps the collar 41' with the shaft 28' (Fig. 9). The steel of the disk 37 is tough, of great strength to resist force applied thereto, but will bend or yield before fracture. In practice the disk may be around 1/8" thick, or #10 or #11 gage, and 18" to 28" in diameter, as herein being 22". A plurality of teeth 38 have cutting edge portions 39 of self-hardening welding rod material or electrodes of say 1/8" diameter Stoody type or #72 Special Phillips self hardening. Bonding 40 (Fig. 5) is a weld anchoring for the material to take grinding to a rigid cutting edge 39 for the disk 37.

In the practice hereunder, for lawn mowing operations when the grass be say under 6" in height, it is usually preferred to leave the detachable guard 34, 35, 36, in a sort of pre-raking position ahead of the cutting blade or horizontally extending rotating disk 37. The disk 37 on its vertical axis shaft 28 is of rigidity to hold up under severe service operations. The lower tips of the pins or teeth 36 may be about 2½" up from the ground surface or the lower tread face of the four wheels 10, 11. Upon removal of the guard 34, 35, 36, notwithstanding the deck 1 may be in the range of but 6" to 7" ground clearance, the high rotative speed for the cutting blade or disk 37, renders this mower effective for cutting growths of height considerably above the deck 1, and even of woody or tough weed in character. In fact, by pushing the deck forward, so that the cutting blade as about 1" inward, is in attack relation, growths as high as five feet have been cut.

The position of the blade 37 upward from the ground surface is readily adjusted by loosening the clamp 31 and thrusting the sleeve 30 upward or downward thru the opening therefor in the deck 1. At the desired spacing upward from the ground, the clamp 31 is reset. The long straight guide roller 26 is in position to direct the belt 25 in its cross extent toward and from the driven pulley 27.

In operation, the high speed of cutting rotation for the disk 37 quickly and efficiently cuts the growth in a plane parallel to the deck 1 and therebelow. The advance or forward edge of the cutting portion 39 is at the lower side of the disk 37. The body of the disk 37, as of hot rolled steel, is tough against fracture, and the weld bindings 40 are so effective that breaking off and throwing thereof is not experienced even in severe operations, such as the striking of stone, metal objects, or like obstructions which the blade may not enter. The hazard from such irregularity in treatment is, at most, only a bending of the disk body 37. In order to cure such difficulty, the operator could at once flatten the disk.

The disk 37 throws material as mowed, back over the top of the disk 37 under the deck 1 and between the skirts 3. The mowed stock thus is quickly delivered in central spill from the rear clearance 5 as directed by the converging portions 4.

Circumferentially as to the disk 37, the teeth 38 have the long straight inwardly extending backing of strengthening value as opposite from the radially extending cutting edge 39.

Figure 8:
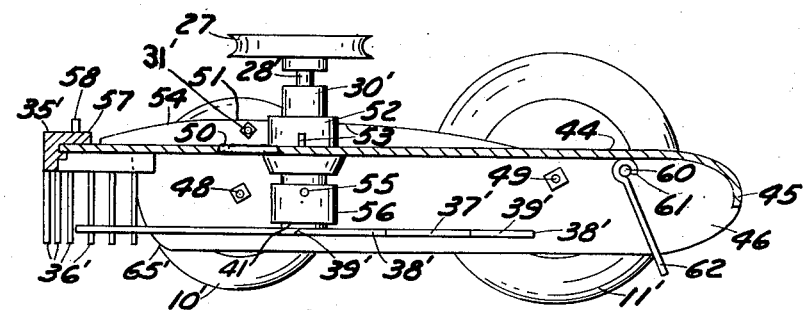
Fig. 8 is a section on the line VIII—VIII, Fig. 6, showing the cutter location under the deck.

*Cast one-piece deck body (Figs. 6, 8)*

Lightness and strength is retained in adopting a unit having a deck 44 flat in general extent to a drop back 45 about half the downward extent of skirt sides 46. Rearward narrowing at portion 47 is only slight. Bolts 48, 49, thru the skirts 46 provide axles or rigid mounting for the wheels 10', 11'. Arc openings 50 thru the deck 44 relieve forward arc portions 51 of a central collar or flange 52 rising from the deck 64. From this collar 52 integral reinforcing ribs 53 diverge at the top of the deck 44. The collar arc portions 51 merge into a reinforcement rib 54.

A clamping bolt 31' serves to draw up the portions 51 to firmly embrace the sleeve 30' at adjusted position sought up or down as to the deck 44. A set screw 55 fixes a sleeve extension or shield 56 with the sleeve 30' to extend into proximity to the disk 37' about the collar 41'. There is thus left exposed above the disk 37' no rotating region which might tend to wind grass, wire or other strand material thereon to tend to clog the equipment.

The side arc strip 35', at its medial portion has a lug 57 thru which extends a wing screw 58 to detachably clamp the strip 35' with the deck 44 forward end.

Bolt openings 59 in the deck 44 (Fig. 6) provide means for directly mounting the prime mover 23', herein shown at an angle of in the range of 25° to 30° for the plane of the pulley 24' as to the medial fore and aft line of the deck 44.

The high speed of rotation for the cutting disk 37', in practice, develops quite a velocity for throwing cut material or objects which may be struck. For the protection of the operator who may be directing the handle 17', there is located a rod 60 (Fig. 8) extending between the skirts 46 somewhat forward of the drop back 45. A weld anchor wrap 61 mounts a depending wing or shield 62 freely to hang and drag along the surface of the ground. This shield is of such extent, as of sheet steel, that in its swinging backward and upward, it strikes the lower edge of the portion 45. As against the aluminum of the deck 44 and its back portion 45, the shield 62 is a protection against fracture from impact by a thrown object.

The eyes 13', 14' (Fig. 6) are spaced somewhat forwardly of the drop back 45, with the converging struts 19' therefrom to a bolt 63 (Fig. 7) at a split sleeve clamp 64, providing ready adjustment for the desired elevation to be set for the handle 17'.

The power unit herein is adapted for a wide range of mowing or cutting operations. As manually directed, the regions for use may be adopted as conforming to operating conditions.

Figure 6:
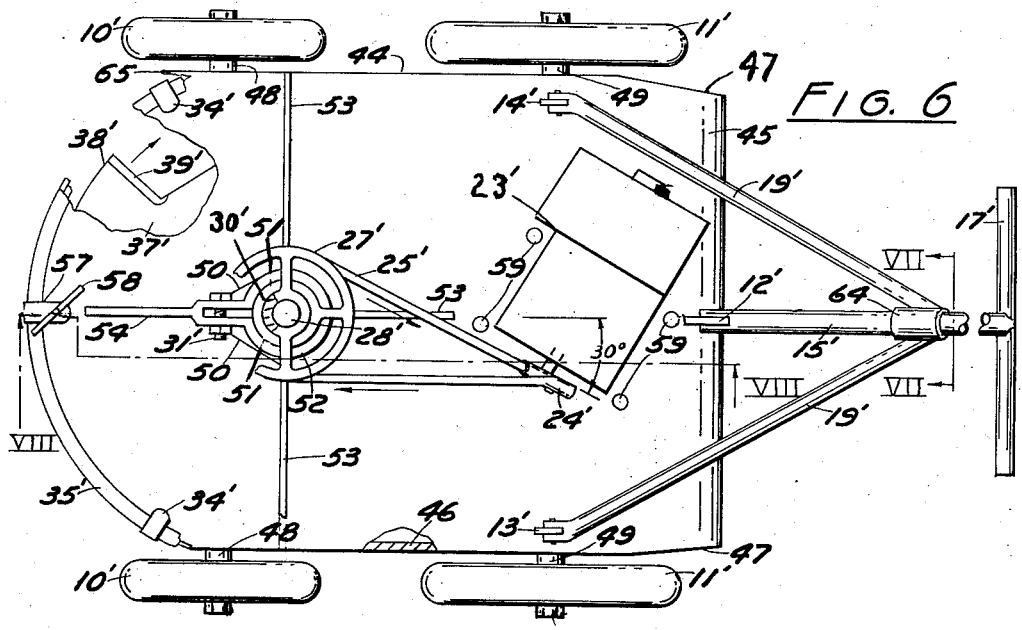
Fig. 6 is a plan view, with parts broken away, of an embodiment of the invention, wherein the deck or body is a cast unit, as of aluminum.
Figure 7:
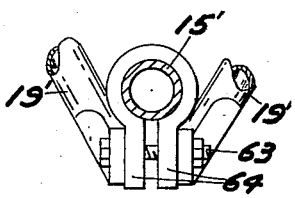
Fig. 7 is an enlarged section from the line VII—VII, Fig. 6, showing the clamp for adjusting the pitch of the staff to the handle as to the deck of the mower.

There is taken into account the direction of rotation of the cutting disk 37'—clockwise in Fig. 6—to provide a shield or extension 65 forwardly from the right hand side skirt portion 46, thereby to protect the right forward wheel 10' from having cut matter or particles thrown theretoward.

What is claimed and it is desired to secure by Letters Patent is:

1. In a lawn mower having a horizontal rotating cutting blade mounted on a vertical shaft journalled in a horizontal deck upon which deck the power source for rotating said blade is mounted, a manipulating handle connected to one end of said deck, and parallel side skirts depending from said deck to which skirts supporting wheels are mounted, the improvement comprising a downwardly extending rear skirt portion integral with said deck and a shield pivotally mounted between said side skirts adjacent the under side of said deck less than the depth of the shield distance from said rear skirt portion, whereby said rear skirt portion acts as a stop to limit the rearward swing of said shield.

2. In the lawn mower of claim 1 wherein said handle is directly pivoted to the central after portion of said deck and there are converging strut means also pivoted to the deck and extending to a clamp on the handle away from the deck, said clamp being adjustable along the handle to be there held in fixing the handle with the deck for transmitting up and down movement of the handle to rock the deck on said supporting wheels therefor.

LAWRENCE J. PULS.

REFERENCES CITED

The following references are of record in the file of this patent:

UNITED STATES PATENTS

| Number | Name | Date |
|---|---|---|
| 827,542 | Lawson | July 31, 1906 |
| 1,550,342 | Cogley | Aug. 18, 1925 |
| 1,805,927 | Sharp | May 19, 1931 |
| 1,992,494 | Lundin | Feb. 26, 1935 |
| 2,017,524 | Bolens | Oct. 15, 1935 |
| 2,208,972 | Goodall | July 23, 1940 |
| 2,225,139 | Urschel | Dec. 17, 1940 |
| 2,232,671 | Loder | Feb. 18, 1941 |
| 2,265,545 | Phelps | Dec. 9, 1941 |
| 2,403,236 | Phelps | July 2, 1946 |
| 2,475,716 | Nabors | July 12, 1949 |
| 2,488,140 | Phillips et al. | Nov. 15, 1949 |
| 2,511,124 | Phelps | June 13, 1950 |